(12) United States Patent
Abrahams et al.

(10) Patent No.: US 8,417,832 B2
(45) Date of Patent: Apr. 9, 2013

(54) ROUTING A SESSION INITIATION PROTOCOL (SIP) MESSAGE IN A COMMUNICATION SYSTEM

(75) Inventors: Faried Abrahams, Laytonsville, MD (US); Kerard R. Hogg, Riddells Creek (AU); Gandhi Sivakumar, Victoria (AU); VijayaGanesh Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 12/938,685

(22) Filed: Nov. 3, 2010

(65) Prior Publication Data
US 2012/0110208 A1 May 3, 2012

(51) Int. Cl.
*G06F 15/16* (2006.01)
(52) U.S. Cl. ......... 709/245; 370/216; 370/352; 455/466
(58) Field of Classification Search .................. 709/245; 370/216, 352; 455/466
See application file for complete search history.

(56) References Cited

U.S. PATENT DOCUMENTS

| | | | |
|---|---|---|---|
| 6,134,316 A | 10/2000 | Kallioniemi et al. | |
| 6,400,719 B1 | 6/2002 | Chimura et al. | |
| 7,254,137 B2 | 8/2007 | Civanlar et al. | |
| 7,480,289 B2 | 1/2009 | Gallant et al. | |
| 7,558,254 B2 | 7/2009 | Haase et al. | |
| 7,693,132 B1* | 4/2010 | Cooper et al. | 370/352 |
| 2004/0019636 A1 | 1/2004 | St. Pierre et al. | |
| 2007/0070990 A1* | 3/2007 | Chong et al. | 370/356 |
| 2007/0243891 A1* | 10/2007 | Civanlar et al. | 455/466 |
| 2008/0240385 A1* | 10/2008 | Mikhailov | 379/88.25 |
| 2009/0136015 A1 | 5/2009 | Roberts | 379/210.02 |
| 2009/0259768 A1* | 10/2009 | McGrath et al. | 709/241 |
| 2009/0268606 A1* | 10/2009 | DeLew et al. | 370/216 |
| 2010/0080376 A1* | 4/2010 | Hartley et al. | 379/211.02 |
| 2010/0091768 A1* | 4/2010 | Gilbert et al. | 370/352 |
| 2012/0110208 A1* | 5/2012 | Abrahams et al. | 709/245 |

OTHER PUBLICATIONS

Granstrom, P. et al., "The future of communication using SIP", Ericsson Review No. 1, 2002, pp. 28-35.*

* cited by examiner

*Primary Examiner* — Yves Dalencourt
*Assistant Examiner* — Michael C Lai
(74) *Attorney, Agent, or Firm* — Ronald A. Kaschak; Ronald A. D'Alessandro; Keohane & D'Alessandro PLLC

(57) ABSTRACT

An approach that provides routing a SIP message to a proxy server of a called party in a communication network is provided. In one embodiment, there is a routing tool that assists in routing a session initiation protocol (SIP) message to a called party. The routing tool, including a receiving component, receives a SIP message of a user making a call in the network. The routing tool further includes a parsing component configured to parse the message to determine the domain of the called party and performs a table lookup using the domain of the called party in order to: retrieve a destination code; embed the destination code into the message; and route the message based on the destination code.

14 Claims, 6 Drawing Sheets

ROUTING A SESSION INITIATION PROTOCOL (SIP) MESSAGE IN A COMMUNICATION SYSTEM

FIELD OF THE INVENTION

This invention relates generally to telecommunication networks and more specifically to routing a session initiation (SIP) message in a communication system.

BACKGROUND OF THE INVENTION

The field of telecommunications has become increasingly important in today's society. Providing a network in which users can quickly and effectively interact with one another presents a significant challenge for network operators. In today's communication networks, session initiation protocol (SIP) plays a key role in providing multimedia sessions to users. Emerging telecommunications technologies are also expected to leverage SIP for its known advantages.

With the expanding number of SIP users, new protocols are needed in order to optimize communication networks. For example, one problem often encountered by a network operator is how to minimize unnecessary traffic in the network. Another problem is how to reduce latency imposed by excessive transactions among proxy servers in the network. The network operator seeks to effectively manage these two issues to increase the speed and reliability of the network in order to meet the growing number of users and their communication needs.

SUMMARY OF THE INVENTION

Embodiments of this invention are directed to routing a session initiation protocol (SIP) message in a SIP environment using domain switches (routing tools) in order to reduce unnecessary traffic and latency in the network. Using this system, the network provider will be able to provide a more efficient network to meet the increasing demands of a growing number of telecommunication users.

In one embodiment, there is a method for routing a session initiation protocol (SIP) message in a communication network, comprising: receiving a SIP message; parsing the message to determine the domain of the called party; performing a table lookup using the domain of the called party to retrieve a destination code and Internet protocol (IP) address of a primary destination device; embedding the destination code into the message; and routing the message to the IP address of the destination device.

In a second embodiment, there is a system for routing a session initiation protocol (SIP) message in a communication network. In this embodiment, the system comprises at least one processing unit and memory operably associated with the at least one processing unit. A domain switch is storable in memory and executable by the at least one processing unit. The domain switch comprises: a receiving component configured to receive a SIP message; a parsing component configured to parse the message to determine the domain of the called party; a lookup component configured to perform a table lookup using the domain of the called party to retrieve a destination code and Internet protocol (IP) address of a primary destination device; an embedding component configured to embed the destination code into the message; and a routing component configured to route the message to the IP address of the destination device.

In a third embodiment, there is a computer-readable storage medium storing computer instructions which, when executed, enables a computer system to provide routing a session initiation protocol (SIP) message in a communication network, the computer readable storage medium comprising program code for causing a computer system to: receive a SIP message; parse the message to determine the domain of the called party; perform a table lookup using the domain of the called party to retrieve a destination code and Internet protocol (IP) address of a primary destination device; embed the destination code into the message; and route the message to the IP address of the destination device.

BRIEF DESCRIPTION OF THE DRAWINGS

These and other features of this invention will be more readily understood from the following detailed description of the various aspects of the invention taken in conjunction with the accompanying drawings in which.

Figure 1:
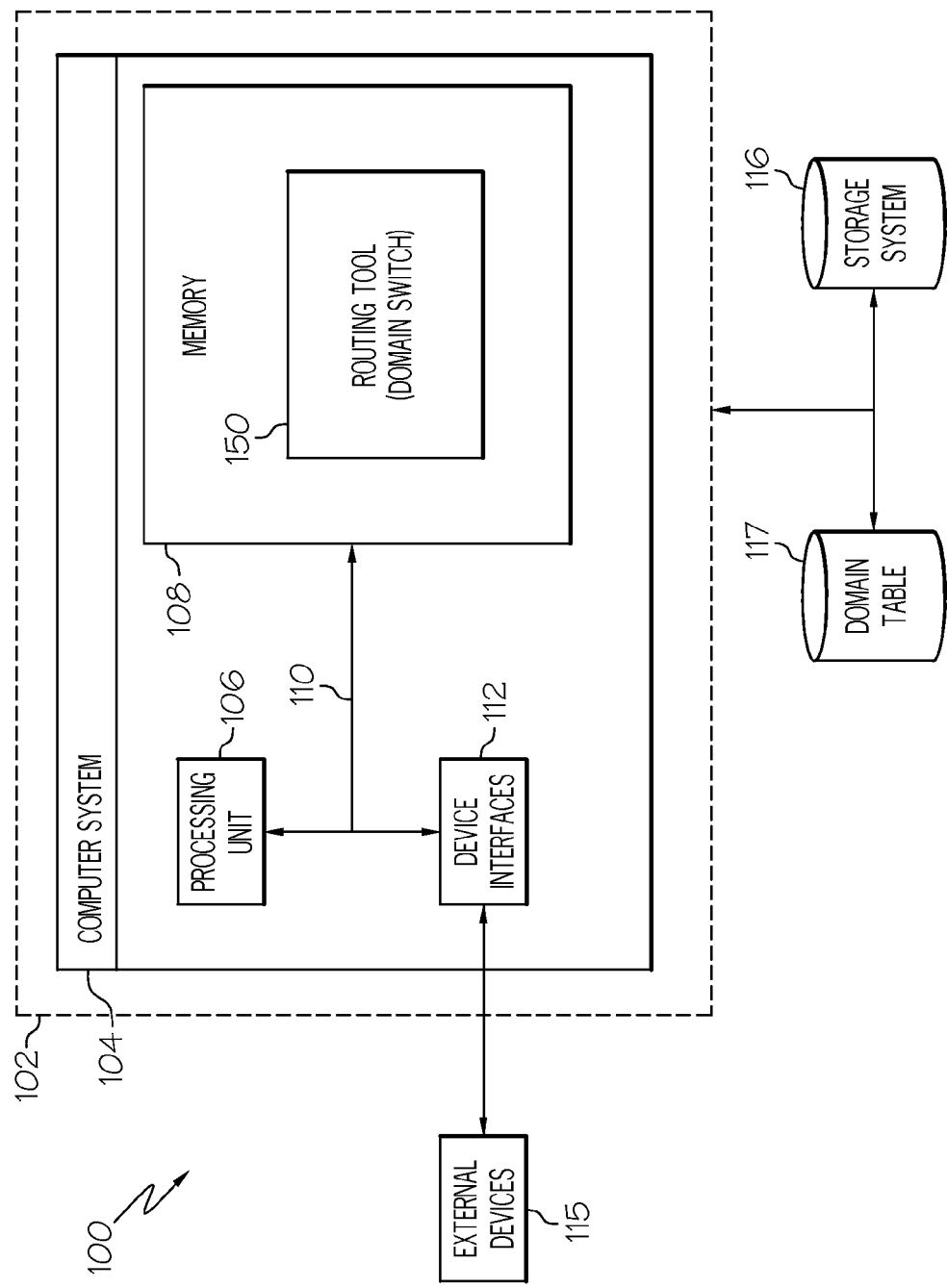
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to routing a call to an appropriate proxy server in a communication network in order to locate the called party using a domain switch. 'Domain switch' as used herein refers to a server plugin (program module or device) or separate device which assists in the efficient routing of a SIP message to a called party in a communication environment by reducing the number of transactions necessary in message delivery. Specifically, the domain switch (routing tool) receives a SIP message of a user making a call in the network, parses the message to determine the domain of the called party, performs a table lookup using the domain of the called party in order to retrieve a destination code and IP address of a destination device, embeds the destination code into the message, and routes the message to the IP address of the destination device.

FIG. 1 illustrates a computerized implementation 100 of the present invention. As depicted, implementation 100 includes computer system 104 deployed within a computer infrastructure 102. This is intended to demonstrate, among other things, that the present invention is implemented within a network environment (e.g., the Internet, a wide area network (WAN), a local area network (LAN), a virtual private network (VPN), etc. Communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for routing a SIP message process. It should be understood that any other computers implemented under the present invention may have different components/software, but will perform similar functions. As shown, computer system 104 includes a processing unit 106, memory 108 for storing a routing tool 150, a bus 110, and device interfaces 112.

In general, processing unit 106 executes computer program code, such as program code for operating routing tool 150, which is stored in memory 108 and/or storage system 116. While executing computer program code, processing unit 106 can read and/or write data to/from memory 108, storage system 116, and a domain table 117. Domain table 117 stores data relating to a plurality of domain switches. Storage system 116 and domain table 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
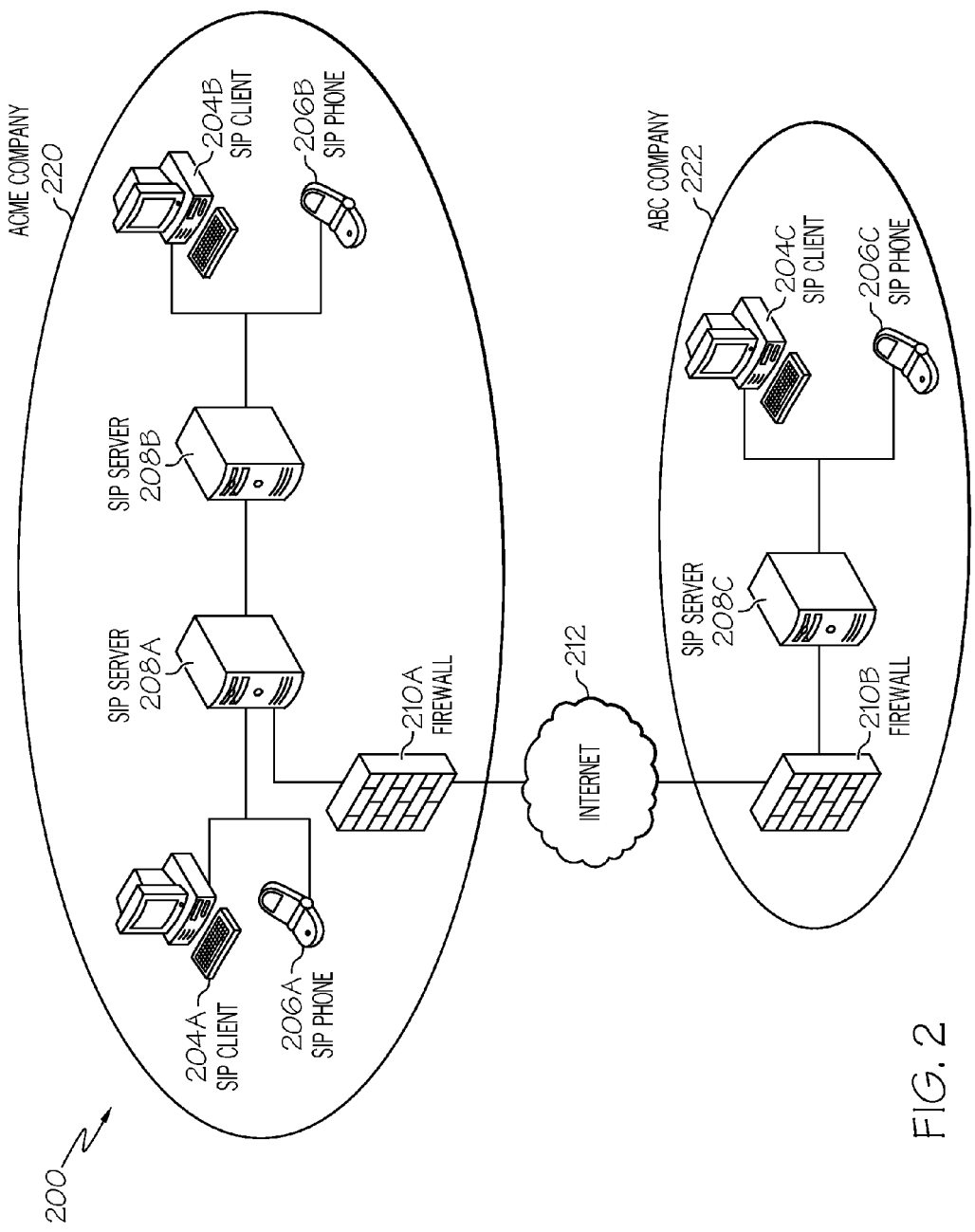
FIG. 2 shows an illustrative session initiation protocol (SIP) architecture diagram.

Referring now to FIG. 2, an illustrative session initiation protocol (SIP) architecture diagram 200 is depicted. SIP is a text-based application-layer signaling and call control protocol used to create, modify, and terminate SIP sessions. FIG. 2 shows how communication is handled among SIP components and how SIP components fit into a network environment.

FIG. 2 depicts two companies, ACME Company 220 and ABC Company 222. ACME Company 220 has four user agents (204A, 204B, 206A, 206B) and two SIP servers (208A, 208B). User agents are end user devices in a SIP system such as cell phones, multimedia handsets, PCs, PDAs, etc. used to create and manage a SIP session. SIP server 208A is connected to Firewall 210A. ABC Company 222 has two user agents (204C, 206C) and SIP server 208C connected to Firewall 210B.

As shown in FIG. 2, ACME Company 220 has two SIP proxy servers (208A, 208B) that direct SIP messages between domains within the company. Each proxy server acts an intermediary entity primarily playing the role of router, meaning its job is to ensure that a request is sent to another entity "closer" to the called party. SIP operates hop-by-hop, meaning clients do not usually communicate directly, but rather use proxies along the signaling path to send and receive messages. Many "hops" are, at times, necessary in determining the location of a called party, giving rise to spaghetti routes that load the network with unnecessary traffic. Moreover, every proxy server performs a DNS (Domain Name System) search to get the IP (Internet Protocol) address, port, and transport protocol of the next hop server. The present invention seeks to reduce the number of hops by routing the SIP message directly to a device able to locate the called party.

In FIG. 2, SIP proxy server 208A connected to firewall 210A handles all SIP messages sent to recipients outside the company and all messages sent to recipients within the company from outside. For example, a SIP message sent from SIP client 204A in ACME Company 220 to SIP client 204C in ABC Company 222 would be sent to SIP proxy server 208A in ACME Company 220. SIP proxy server 208A then forwards the SIP message to destination SIP client computer 204C, or the SIP IP phone 206C, in the domain of SIP proxy server 208C in ABC Company 222.

Figure 3:
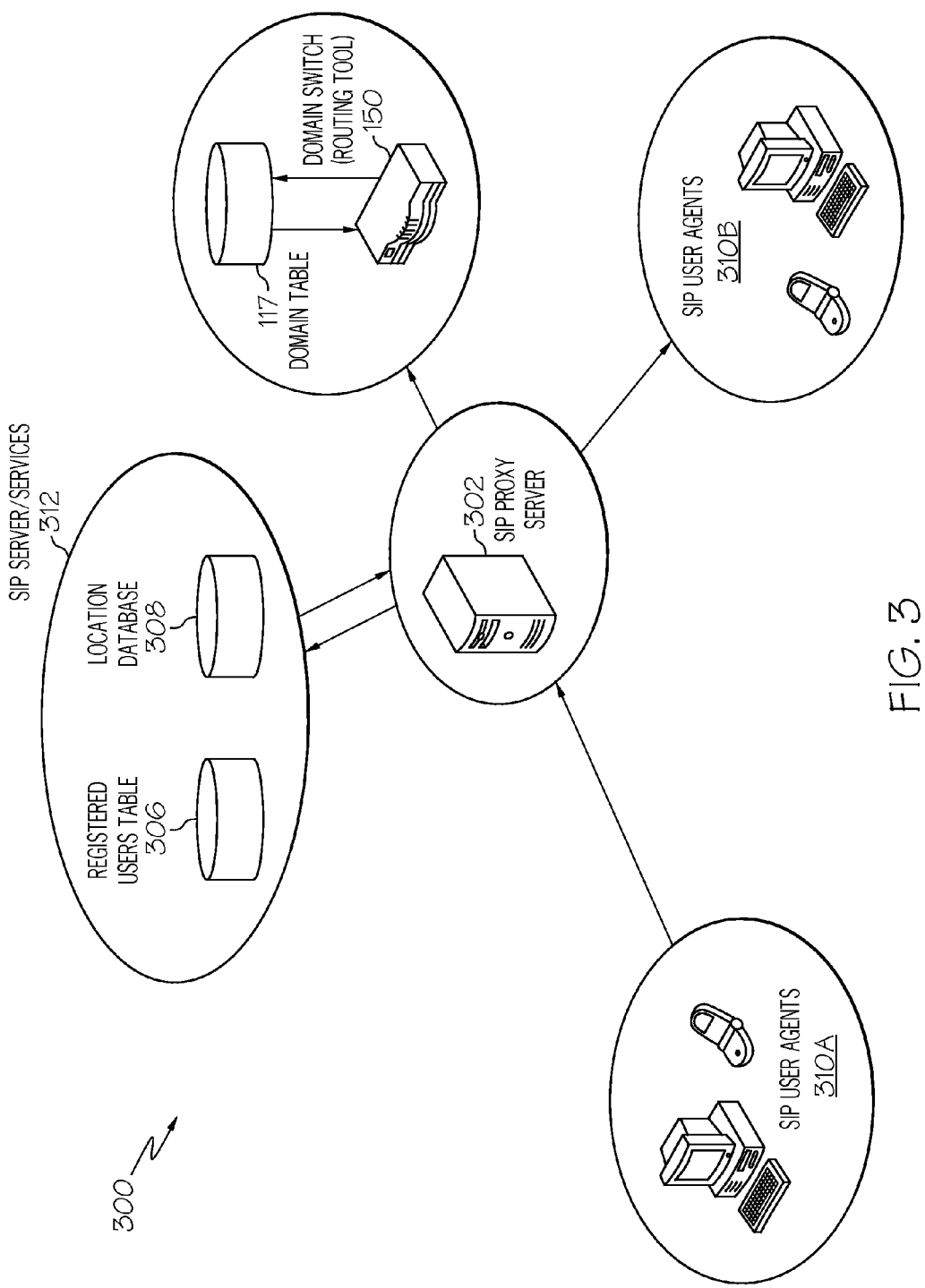
FIG. 3 shows basic services provided by SIP servers and the interactions between SIP components including a domain switch according to the present invention.

FIG. 3 shows communication system 300 with basic services 312 utilized by SIP server 302 and the interactions between SIP components including domain switch 150. SIP proxy 302 handles SIP messages between user agents 310A and 310B. Basic SIP server/services 312 includes maintaining/accessing data in registered users table 306 and location database 308. Registered users table 306 contains a list of all user agents within the served domain(s) (in this example, 310A and 310B). Location database 308 stores the addresses of those user agents that are registered within registered users table 306. Location database 308 also provides information about a caller's possible locations to SIP proxy 302.

FIG. 3 further depicts domain switch 150 (or routing tool) which provides means to minimize the number of "hops" necessary in locating a called party, thereby reducing network traffic and connection delays. Domain switch 150 serves a plurality of domains and a plurality of users in each of the domains. Each domain switch is identified by a unique destination code. Each domain switch is able to access the destination codes and IP addresses of a plurality of other specified domain switches. Each domain switch has links, either physical or logical, to each of the plurality of other specified domain switches. Domain switch 150 reads domain table 117 to determine how to route a SIP message received by SIP proxy server 302 (described in more detail below).

Figure 4:
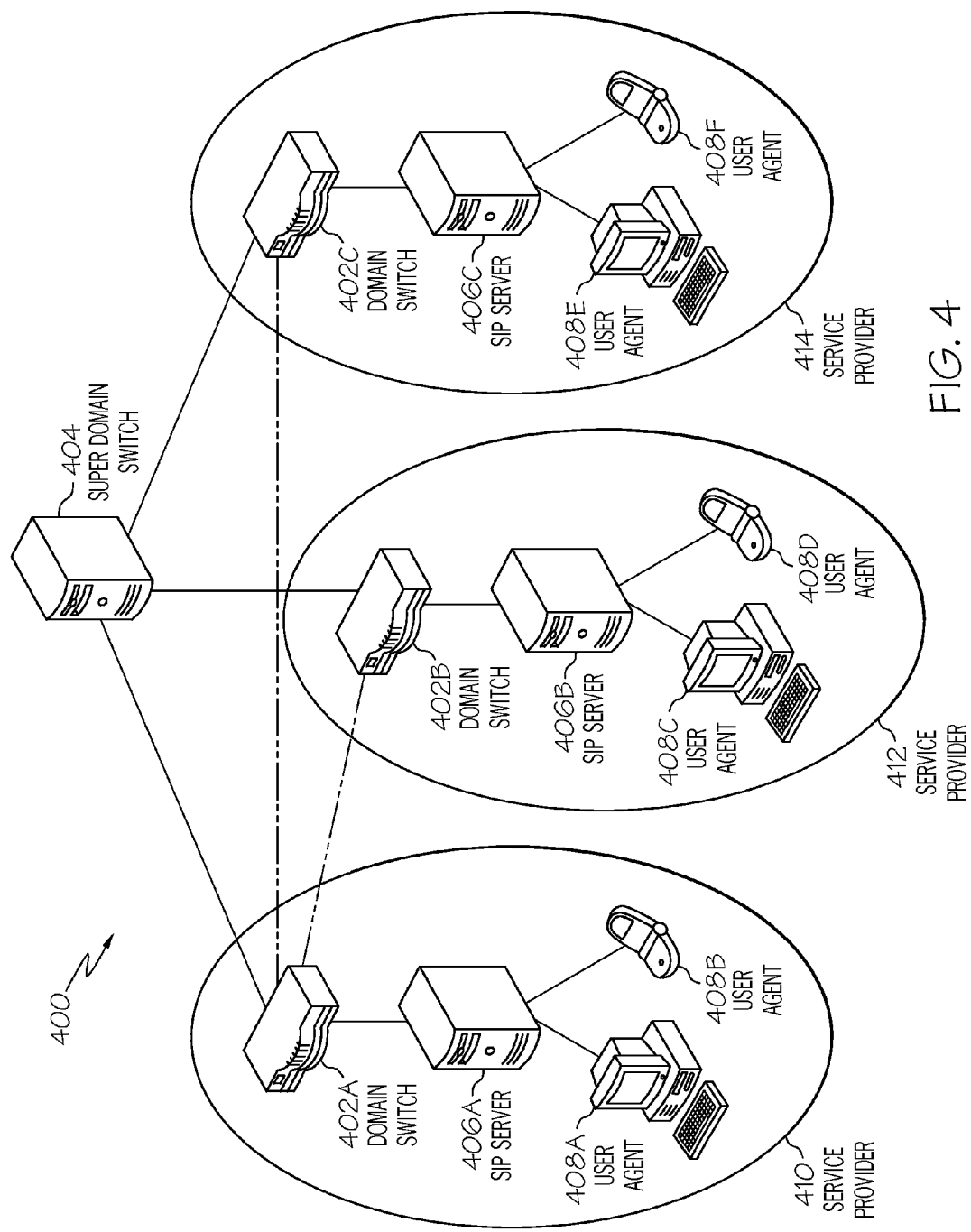
FIG. 4 shows an illustrative communication system according to the present invention.

FIG. 4 shows an exemplary communication system 400 using SIP according to one embodiment of this invention. FIG. 4 depicts three SIP-based service providers (410, 412, 414). Service provider 410 has user agents (408A, 408B) linked to SIP server 406A and domain switch 402A. Service provider 412 has user agents (408C, 408D) linked to SIP server 406B and domain switch 402B. Service provider 414 has user agents (408E, 408F) linked to SIP server 406C and domain switch 402C. Each domain switch is linked to super domain switch 404.

A proxy server, on receiving a SIP message, hands over the SIP message to the local (calling party) domain switch. The local domain switch parses the SIP message to retrieve the domain of the called party. The domain switch performs a table lookup using the domain of the called party and retrieves a destination code associated with the domain switch of the called party. The domain switch wraps the message with the destination code and routes the call to the domain switch of the called party.

In cases where the domain switch is unable to find the destination code associated with the domain of the called party during the table lookup, it wraps the SIP message with the code of a super domain switch (or secondary device) and forwards the SIP message to the super domain switch. The domain switch system is a hierarchical system for assisting in the routing of a SIP message to the called party. The top of that hierarchy is the super domain switch. The super domain switch holds the list of names, destination codes, addresses, and served domains of the lower-level domain switches.

Figure 5:
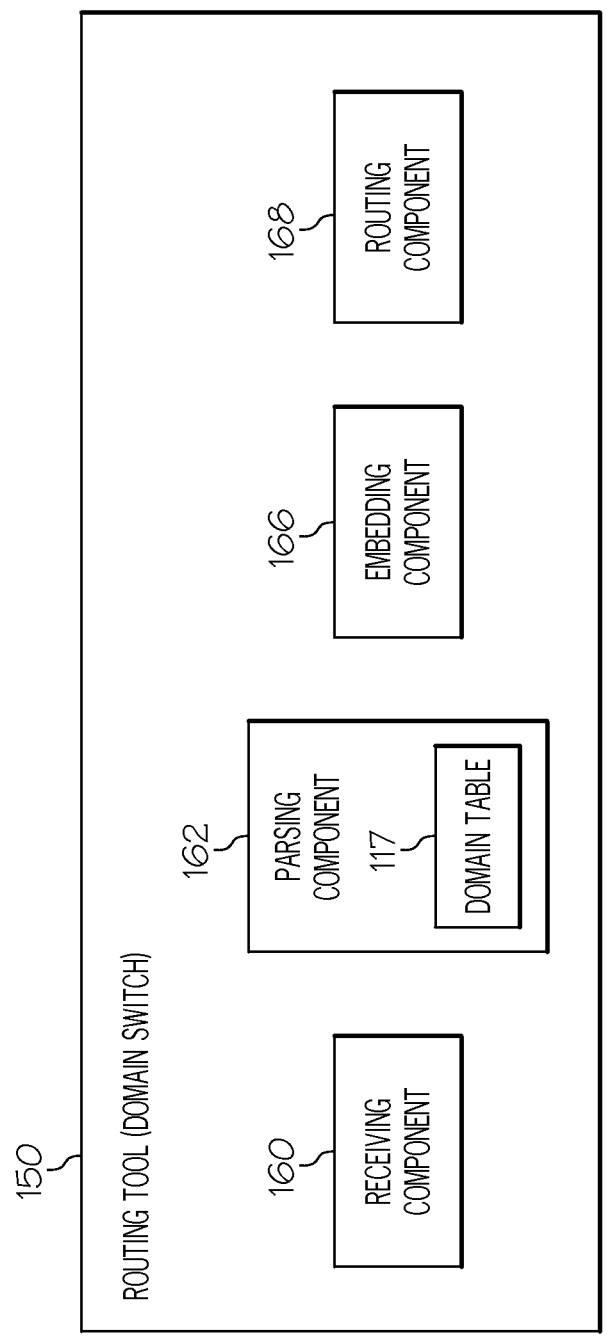
FIG. 5 shows a routing tool according to one embodiment of this invention that operates in the communication system.

FIG. 5 shows a more detailed view of domain switch 150, which assists in routing the message to a called party in a communication system. The local SIP proxy server is the first point of contact when a call is made. The SIP proxy interrogates the details of the message and hands the message to a local domain switch if the SIP proxy server is unable to locate the IP address in its registered user agents table (see 306 of FIG. 3). As shown, domain switch 150 comprises a receiving component 160 configured to receive a SIP message from the proxy server. Parsing component 162 parses the SIP message to retrieve the domain of the called party. Using the domain of the called party, parsing component 162 performs a table lookup of domain table 117. An example is shown below for DS1 (Domain Table 1).

DOMAIN TABLE 1

| Domain Switch ID | Destination Code | IP Address | Served Domains | Link ID from DS1 |
|---|---|---|---|---|
| DS1 | 2246 | aa1.bb1.cc1.dd1 | A1.com B1.com C1.com | n/a |
| DS2 | 2245 | aa2.bb2.cc2.dd2 | D1.com E1.com F1.com | 03 |
| DS3 | 2243 | aa3.bb3.cc3.dd3 | G1.com H1.com I1.com J1.com | 04 |
| SDS1 | 2247 | aa4.bb4.cc4.dd4 | Others | 01 |

The IP address and the destination code of the domain switch associated with the called party are retrieved from the domain table. In this example, the IP address and destination code for domain switch 3 (DS3) are retrieved. Embedding component 166 embeds (or wraps) the SIP message with the code of DS3 (i.e., 2243). Routing component 168 routes the call to the IP address of DS3 (i.e., aa3.bb3.cc3.dd3).

In another embodiment of the present invention, in cases when the domain switch is unable to find the destination code associated with the domain switch of the called party when doing a domain table lookup, the domain switch wraps the SIP message with the code of a super domain switch (or secondary device) and forwards the SIP message to the super domain switch. Referring back to FIG. 4, in cases when parsing component 162 of domain switch 402A is unable to locate the destination code of the domain switch of a called party, embedding component 166 of domain switch 402A embeds the destination code of super domain switch 404 into the SIP message and routing component 168 of domain switch 402A routes the message to super domain switch 404.

In another embodiment of the present invention, a SIP message is delivered to a called party roaming in an area of another service provider. For example, user agent 408F roams in a network outside of service provider 414, such as the network area of service provider 412. After authentication, user agent 408F is registered in the table of registered users (see 306 of FIG. 3) of service provider 412. SIP server 406B contacts the domain switch associated with the home area of user agent 408F (domain switch 402C) using an appropriate method. SIP server 406C updates the location of user agent 408F in location database of registered users (see 308 of FIG. 3). When user agent 408B calls user agent 408F, the call reaches domain switch 402C, which in turn wraps the message with the code of the domain switch 402B (where user agent 408F is registered currently) and routes the call to domain switch 406B. SIP server 406B delivers the call to user agent 408F.

In still another embodiment of the present invention, when the domain switch of the called party receives the SIP message embedded with the destination code associated with the receiving domain switch, the domain switch recognizes that the SIP message has arrived at the desired destination. The domain switch hands the SIP message over to a local proxy server of the called party and the message is delivered to the called party. Referring back to FIG. 4, when the SIP message is received by DS3 (destination domain switch), the SIP message is handed over to SIP server 406C. SIP server 406C delivers the message to the called party.

Figure 6:
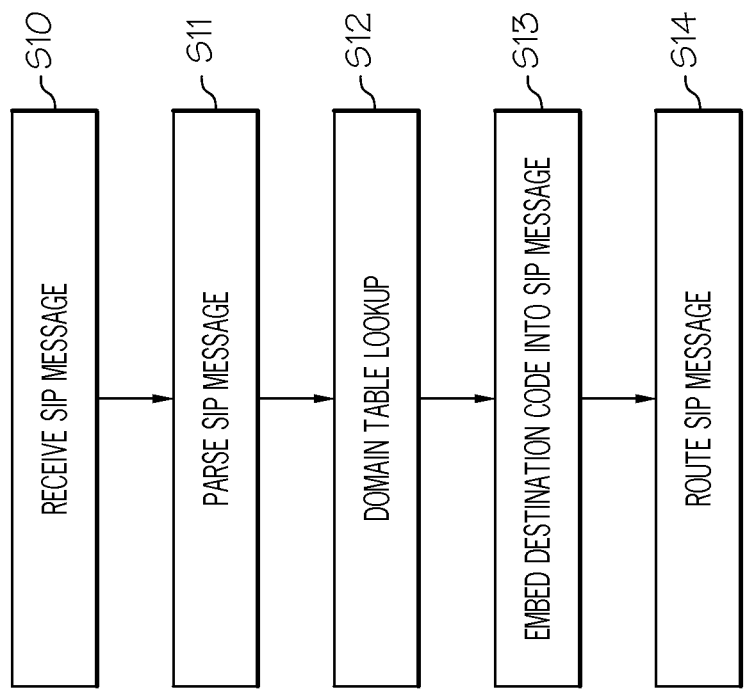
FIG. 6 shows a flow diagram of a process for routing a SIP message to a called party in a communication system.

FIG. 6 depicts the methods disclosed herein. According to one embodiment, in step S10, identification tool 150 receives the SIP message of the calling party. In S11, the SIP is parsed in order to retrieve the domain of the called party. In S12, a domain table lookup is performed to retrieve the destination code and IP address associated with the domain switch of the called party. In S13, the destination code is embedded into the SIP message. In S14, the SIP message is routed to the IP address of the domain switch of the called party.

The flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as a solution for routing a SIP message to a called party in a communication system, it is understood that the invention further provides various alternative embodiments. For example, in one embodiment, the invention provides a computer-readable/useable medium that includes computer program code to enable a computer infrastructure to provide routing a SIP message functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 1) and/or storage system 116 (FIG. 1) (e.g., a fixed disk, a read-only memory, a random access memory, a cache memory, etc.).

In another embodiment, the invention provides a computer-implemented method for providing routing a SIP message in a communication system function. In this case, a computer infrastructure, such as computer system 102 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 102 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for routing a session initiation protocol (SIP) message in a communication network, comprising:
    receiving a SIP message;
    parsing the message to determine a domain of a called party;
    performing a table lookup using the domain of the called party to retrieve a destination code and Internet protocol (IP) address associated with a primary destination device;
    performing a table lookup using the domain of the called party to retrieve a destination code and Internet protocol (IP) address of a secondary destination device in the case that the destination code and IP address of the primary destination device are not retrieved;
    embedding the destination code into the message; and
    routing the message to the IP address of the primary destination device.

2. The method according to claim 1, wherein receiving a SIP message comprises receiving by an input device or a communication interface of a server device.

3. The method according to claim 1, further comprising routing the message to the IP address of the secondary destination device.

4. The method according to claim 1, further comprising: parsing the message for a destination code and routing the message along an available route based on the destination code when a destination code is found.

5. A routing tool for routing a session initiation protocol (SIP) message in a communication network, comprising:
    a memory medium comprising instructions;
    a bus coupled to the memory medium; and
    a processor coupled to the bus that when executing the instructions causes the routing tool to:
        receive a SIP message;
        parse the message to determine a domain of a called party;
        perform a table lookup using the domain of the called party to retrieve a destination code and Internet protocol (IP) address associated with a primary destination device;
        perform a table looku usin the domain of the called s art to retrieve a destination code and Internet protocol (IP) address of a secondary destination device in the case that the destination code and IP address of the primary destination device are not retrieved;
        embed the destination code into the message; and route the message to the IP address of the primary destination device.

6. The routing tool according to claim 5, being further caused to retrieve a SIP message by an input device or a communication interface of a server device.

7. The routing tool according to claim 5, being further caused to route the message to the IP address of the secondary destination device.

8. The routing tool according to claim 5, being further caused to parse the message for a destination code and route the message along an available route based on the destination code when a destination code is found.

9. A non-transitory computer-readable storage medium containing a program product for routing a session initiation protocol (SIP) message in a communication network, the program product comprising program code for causing a computer system to:
    receive a SIP message;
    parse the message to determine a domain of a called party;
    perform a table lookup using the domain of the called party to retrieve a destination code and Internet protocol (IP) address associated with a primary destination device;
    perform a table lookup using the domain of the called party to retrieve a destination code and Internet protocol (IP) address of a secondary destination device in the case that the destination code and IP address of the primary destination device are not retrieved.
    embed the destination code into the message; and
    route the message to the IP address of the primary destination device.

10. The non-transitory computer readable storage medium of claim 9, wherein the SIP message is received by an input device or a communication interface of a server device.

11. The non-transitory computer readable storage medium of claim 9, the program product further comprising program code for causing the computer system to route the message to the IP address of the secondary destination device.

12. The non-transitory computer readable storage medium of claim 9, the program product further comprising program code for causing the computer system to parse the message for a destination, and wherein the message is routed along an available route based on the destination code when a destination code is found.

13. The non-transitory computer readable storage medium of claim 9, wherein the message is routed along a dedicated physical link.

14. The non-transitory computer readable storage medium of claim 9, wherein the message is routed along a dedicated logical link.

* * * * *